(12) United States Patent
Xu

(10) Patent No.: US 9,886,518 B1
(45) Date of Patent: Feb. 6, 2018

(54) DEEP INTEGRATION OF PROGRAMMING LANGUAGE AND MARKUP LANGUAGE CONSTRUCTS

(75) Inventor: Sichun Xu, Santa Clara, CA (US)

(73) Assignee: MyEzApp Inc., Santa Clara, CA (US)

( * ) Notice: Subject to any disclaimer, the term of this patent is extended or adjusted under 35 U.S.C. 154(b) by 544 days.

(21) Appl. No.: 13/584,645

(22) Filed: Aug. 13, 2012

Related U.S. Application Data

(60) Provisional application No. 61/527,421, filed on Aug. 25, 2011.

(51) Int. Cl.
*G06F 17/00* (2006.01)
*G06F 17/30* (2006.01)
*G06F 17/22* (2006.01)

(52) U.S. Cl.
CPC .. *G06F 17/30896* (2013.01); *G06F 17/30607* (2013.01); *G06F 17/2247* (2013.01)

(58) Field of Classification Search
CPC ........... G06F 17/2247; G06F 17/30896; G06F 17/30607
See application file for complete search history.

(56) References Cited

U.S. PATENT DOCUMENTS

| | | | |
|---|---|---|---|
| 5,991,539 A | 11/1999 | Williams | |
| 6,182,281 B1 | 1/2001 | Nackman et al. | |
| 6,286,130 B1 | 9/2001 | Poulsen et al. | |
| 6,385,341 B1 | 5/2002 | Lisitsa et al. | |
| 6,480,865 B1* | 11/2002 | Lee et al. | 715/234 |
| 7,552,384 B2* | 6/2009 | Marmigere | G06F 17/272 |
| | | | 707/999.006 |
| 7,614,044 B2 | 11/2009 | Bhansali et al. | |
| 7,861,072 B2 | 12/2010 | Duffy et al. | |
| 8,146,085 B2 | 3/2012 | Duffy et al. | |
| 8,271,768 B2 | 9/2012 | Duffy et al. | |
| 2006/0129971 A1* | 6/2006 | Rojer | 717/104 |
| 2006/0149543 A1 | 7/2006 | Lassalle | |
| 2007/0101258 A1* | 5/2007 | Xu | G06F 17/30893 |
| | | | 715/234 |
| 2007/0214452 A1 | 9/2007 | McCrady et al. | |
| 2008/0141228 A1 | 6/2008 | Jeong | |
| 2010/0088674 A1 | 4/2010 | Della-Libera et al. | |
| 2010/0235280 A1 | 9/2010 | Boyd et al. | |
| 2010/0325618 A1 | 12/2010 | Song et al. | |
| 2010/0325619 A1 | 12/2010 | Song et al. | |
| 2013/0055223 A1 | 2/2013 | Xu | |

OTHER PUBLICATIONS

Mudassar Khan, "pass function as argument or parameter in JavaScript," Nov. 17, 2010, aspsnippets.com, pp. 1-9.*
Notice of Allowance issued in U.S. Appl. No. 13/331,996; dated Jun. 13, 2014; 17 pages.

* cited by examiner

*Primary Examiner* — Ariel Mercado
(74) *Attorney, Agent, or Firm* — Fountainhead Law Group P.C.

(57) ABSTRACT

Disclosed is a programming paradigm that integrates programming language constructs with markup language constructs in a document. Processing of the body of a tag in the markup language constructs produces output. A function or method associated with the tag may be invoked, including providing as input to the function or method the output from tag processing the body of the first tag.

20 Claims, 13 Drawing Sheets

```
runtime.openElement(false, "tabs", new java.lang.Object[]{}, ...);
for(long vI = 1;(vI <= 3);vI = (vI + 1)){
    runtime.openElement(false, "tab", new java.lang.Object[]{"title", "t1"}, ...);
    runtime.generateText("\n");
    runtime.generateText(" ");
    runtime.generateText("Hello");
    runtime.generateText(" ");
    runtime.generateText("World");
    runtime.generateText("!");
    runtime.generateText("\n");
    runtime.generateText(" ");
    runtime.closeElement("tab", webscript.pComp.sTabs.cSubtab.class, 46, 0);
}
runtime.closeElement("tabs", webscript.pComp.sTabs.cTabs.class, 17, 0);
```

DEEP INTEGRATION OF PROGRAMMING LANGUAGE AND MARKUP LANGUAGE CONSTRUCTS

CROSS REFERENCE TO RELATED APPLICATIONS

The present disclosure claims priority to U.S. Provisional App. No. 61/527,421 filed Aug. 25, 2011, the content of which is incorporated herein by reference in its entirety for all purposes. The present disclosure incorporates herein by reference, in its entirety and for all purposes, commonly owned U.S. application Ser. No. 13/331,996, filed Dec. 20, 2011, now U.S. Pat. No. 8,843,907.

BACKGROUND

Unless otherwise indicated herein, the approaches described in this section are not prior art to the claims in this application and are not admitted to be prior art by inclusion in this section.

Markup languages and procedural languages are two kinds of computer languages. A markup language such as extensible markup language (XML) and hypertext markup language (HTML) is declarative in nature, while a procedural language (e.g., C programming language C++ programming language) is imperative in nature. From a functionality perspective, markup languages are usually not Turing complete. On the other hand, procedural languages are Turing complete, which means procedural languages are more powerful than markup languages. However, from a usability perspective, a markup language is typically much easier to learn. The number of people who can write HTML far exceeds the number of people who can program in a procedural language.

Attempts have been made to combine a markup language with a procedural language in order to provide a programming environment that is accessible to beginners who are not inclined to learn a procedural language, but at the same time is powerful enough for experienced programmers who need a more structured language in order to develop sophisticated software components. For example, JavaFX and ECMAScript for XML represent attempts at integrating a markup language into a procedural language. Adobe® AIR, XAML, and ZUML represent attempts at integrating a procedural language into a markup language. These attempts have limited capability. For example, tag structures are all static and tag object mappings are shallow.

A technology called JavaServer Pages (JSP) allows software developers to create dynamically generated web pages based on HTML or XML. However, JSP separates tag definitions from tag usage into two different languages having completely different syntaxes. JSP can therefore be inconvenient to use, even for experienced programmers not to mention beginners.

BRIEF DESCRIPTION OF THE DRAWINGS

FIG. 11 shows an example of some intermediate code 104.

DETAILED DESCRIPTION

Disclosed embodiments relate to a programming paradigm and programming language that integrates elements of a markup language with the structure of a procedural programming language. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
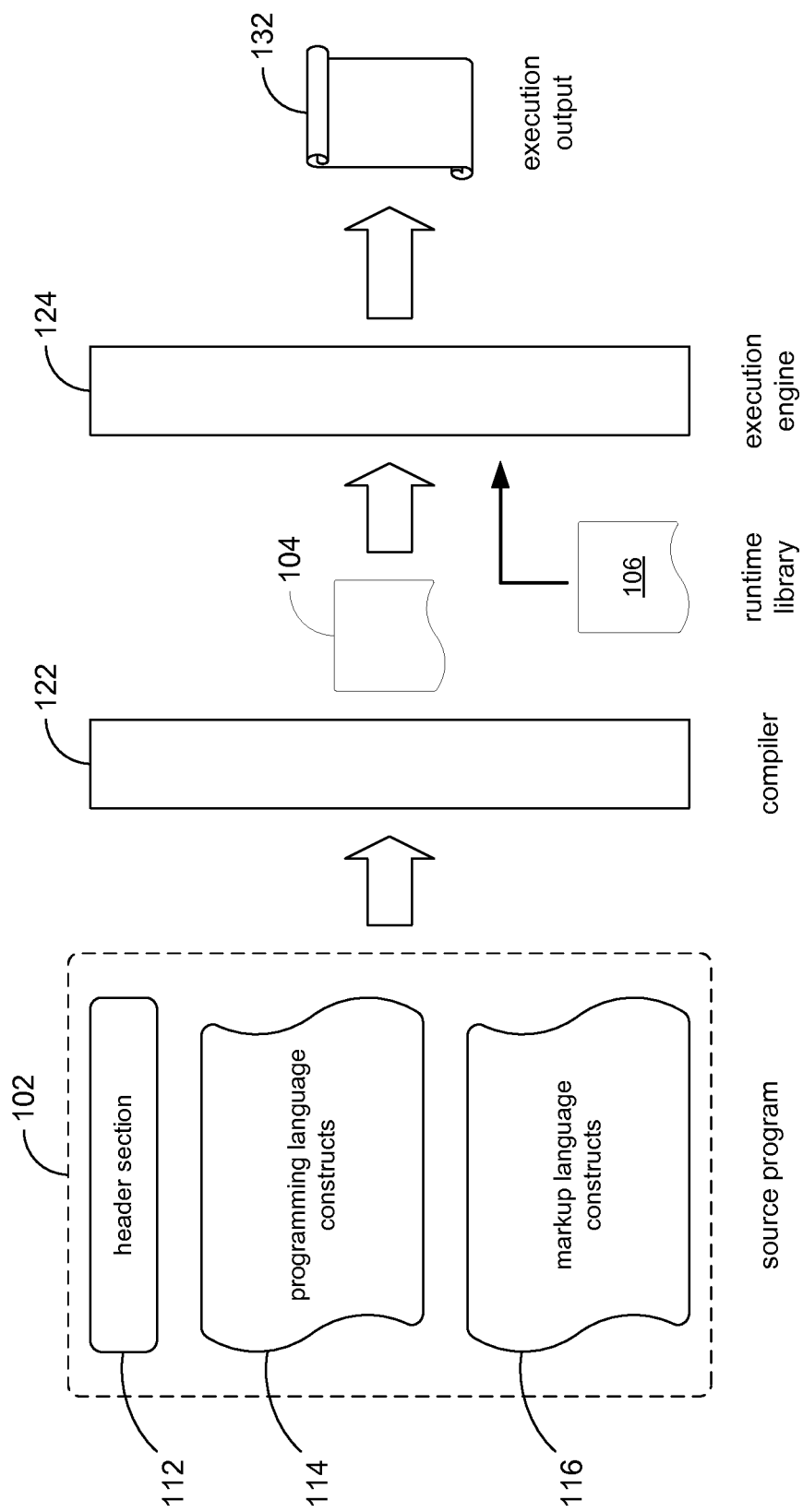
FIG. 1 is a system diagram according to an illustrative embodiment of the present disclosure.

FIG. 1 shows a configuration in accordance with embodiments of the present disclosure. A source program 102 may be compiled by a compiler 122 to produce intermediate code 104. The intermediate code 104 may be executed by an execution engine 124 to produce execution output 132. The runtime library 106 may provide specific system functions, such as generation of output, network and file system access, and so on. Linking with the runtime library 106 allows the intermediate code 104 to access such system functions. The separation between runtime library 106 and execution engine 124 is optional. In some embodiments, the execution engine 124 may be a generic engine such as the Java Virtual Machine. In other embodiments, the runtime library 106 may be incorporated into the execution engine 124. An example of the execution engine 124 may be a renderer to render text and graphics and may be incorporated in a web browser, a document reader, and the like.

In some embodiments, the compiler 122 may be provided on a computer system that is programmed with executable program code to produce the intermediate code 104. The executable program code may be stored in a non-transitory computer readable storage medium such as disk storage, including magnetic storage media and optical storage media. The execution engine 124 may be the same computer system or another computer system. In some embodiments, the intermediate code 104 may be executable program code that is executed by the execution engine 124. In other embodiments, the intermediate code 104 may be an interpreted code (e.g., Java bytecode) that is executed by a virtual machine executing on the execution engine 124 (e.g., Java Virtual Machine, JVM).

In accordance with principles of the present disclosure, the source program 102 may comprise programming language constructs 114 and markup language constructs 116. The source program 102 may include a header section 112, which may comprise special instructions (sometimes referred to as "directives") directed to a preprocessor (not shown) or the compiler 122 instructing how to process the source program, prior to actual compilation. The preprocessor (not shown) may be a separate component or may be incorporated in the compiler 122. An example of a directive is the construct "#include <filename>", taken from the C programming language, which instructs the preprocessor to include the content of a document called "filename" into the same document that contains the directive.

In some embodiments, the programming language constructs 114 may include constructs defined in accordance with a programming language. For example, the programming language may be a procedural language such as the C programming language. Consider, for example, the following "function declaration" programming language construct:

```
func routine1( )
    print "Hello world"
end
```

The function declaration "func routine1( )" specifies the name of the function (function name), namely routine1. This function does not have any parameters, as indicated by the empty parentheses "( )" in the function declaration. The "print" statement constitutes the "body" of the function (function body). In accordance with present disclosure, the body of a function may comprise any arbitrary text, including valid program code and non-program code text (including tag references). An example of a compiler that can compile such code is disclosed in commonly owned U.S. application Ser. No. 13/331,996.

Another example of a function declaration is the following:

```
func routine2(param_1 as TEXT, param_2 as FLOAT)
    print "enter input values"
    print "the input parameters are:" param_1 "and" param_2"
end
```

This function declaration program construct defines a function called routine2. The function declaration defines two parameters: param_1 and param_2, which are passed to the function when the function is invoked. The data type of param_1 is textual data, and the data type of param_2 is a floating point number.

In some embodiments according to the present disclosure, the programming language constructs 114 may include constructs defined in accordance with object oriented languages. Consider, for example, the following "class declaration" programming language construct:

```
class object1
    var c_param_1 as TEXT
    var c_param_2 as INT
    func routine1( )
        body of routine1
    end
    func routine2(f_param_1 as INT, f_param_2 as TEXT)
        body of routine2
    end
end
```

The class declaration programming language construct defines an object class (or simply a class). The name of the class (class name) is object1. As understood by those of ordinary skill in the art, the class declaration is "instantiated" at runtime to create an actual instance of the object in the runtime environment. The class declaration may define zero or more "class variables". The example above defines two class variables: c_param_1 and c_param_2. The class declaration may define zero or more "methods". The example above defines two methods: routine1 and routine2. The method routine2 takes two parameters f_param_1, f_param_2 when invoked. The program code that comprises the body of a method (e.g., routine1 or routine2) may reference the class variables (e.g., c_param_1 and c_param_2).

The source program 102 further comprises the markup language constructs 116. As generally known, a markup language is designed for the processing, definition, and presentation of text and/or graphics in a document, or on a display, and the like. A markup language specifies code to format both the layout and style of the text and/or graphics that is to be rendered. Examples of markup languages include extensible markup language (XML) and hypertext markup language (HTML). The present disclosure can be used to adapt an existing markup language or to define a new markup language.

In some embodiments, the markup language constructs 116 in source program 102 may include references to "simple tags" and "complex tags". Following is an example of a simple tag:

```
<title-page/>
```

The name of the tag (tag name) is title-page. The tag is set forth with delimiters "<" and "/>" to distinguish the tag from a non-tag element. This example of a tag does not have any (tag) "attributes". Consider the following example of a simple tag with attributes:

```
<title-author title-attr="Intro to Mechanics" author-attr="John Smith"/>
```

The name of this tag is title-author, and its two attributes are named title-attr and author-attr. The attribute values of the two attributes are the respective strings "Intro to Mechanics" and "John Smith".

Following is an example of a complex tag:

```
<tag-one>
    <var1>"any string"</var1>
    assign-one="assign value one"
    <tag-two>
        assign-two="assign value two"
    </tag-two>
    <tag-three/>
</tag-one>
``` where the name of the complex tag is tag-one. The complex tag is delimited with an "opening tag"<tag-one> and a "closing tag"</tag-one>. A complex tag may have zero or more "child tags" (children tags). For example, var1 is a child tag and tag-two is a child tag. Although van and tag-two are complex tags, children tags may be simple tags such as tag-three. A complex tag may have zero or more "non-tag elements". In the example above, assign-one="assign value one" is a non-tag element, and in particular is an assignment statement. In accordance with the present disclosure, non-tag elements may include arithmetic expressions, logical expressions, arbitrary programming language constructs, and in general any arbitrary text. The child tags and non-tag elements constitute the "body" (tag body) of the complex tag tag-one. As illustrated in the example above, child tags and non-tag elements may appear in the body of a complex tag in any order. The opening tag in the example above does not have any attributes. However, the opening tag of a complex tag, in general, may include attributes, as illustrated in the following example:

```
<tag-one attr1="value 1" attr2="3.14159">
    <var1>"any string"</var1>
    assign-one="assign value one"
    <tag-two>
        assign-two="assign value two"
    </tag-two>
</tag-one>
```

As will be explained below, tags (simple tags and complex tags) may be "processed", and tags may produce output when they are processed. The output may appear in a document or on a display as text and/or graphics produced in accordance with the processing of the tags, and, may be referred to as "tag output", "generated tag body", "output of the tag", or simply output. As will be explained, the tag output may be accessed and used during the processing of its parent tag.

In accordance with principles set forth in the present disclosure, markup language constructs 116 in the source program 102 may be associated with (correspond to, match, etc.) programming language constructs 114 in the source program. In particular, a tag that is referenced among the markup language constructs 116 may be associated with a programming language construct that is declared among the programming language constructs 114 in the source program. The specific actions that occur during processing of a tag will depend on the particulars of the tag and the particulars of the programming language construct (e.g., function declaration or a class declaration) that the tag is associated with.

For example, if a tag is associated with a function declaration, then processing of the tag may include invoking the function that is defined by the associated function declaration. If the tag includes an attribute that is associated with a parameter of the function, then its attribute value may be passed to the function as the function's parameter. Output generated by the function may serve as the output of the tag.

If a tag is associated with a class declaration that is declared among the programming language constructs 114 in the source program, then processing of the tag may include instantiating an object that is defined by the class declaration and configuring the instantiated object. In some embodiments, if the tag is a complex tag that is associated with a class declaration, then configuring the instantiated object during processing of the tag may include assigning the output of children tags to class variables of the instantiated object. If a child tag is associated with a method defined in the class declaration, the method may be invoked in the environment of the instantiated object. In some embodiments, attributes of the child tag may be passed to the method during invocation of the method. In some embodiments, processing of a tag that is associated with a class declaration may include invoking one or more "special" methods defined in the class declaration.

As will be used herein, the phrases "function-based tag" or "function tag" or the like, will be understood as referring to a tag that is: (1) referenced among the markup language constructs 116 in the source program 102; and (2) is associated with a function declaration that is declared among the programming language constructs 114 in the source program. Likewise, the phrases "class-based tag" or "class tag" or the like will be understood as referring to a tag that is: (1) referenced among the markup language constructs 116 in the source program 102; and (2) is associated with a class declaration that is declared among the programming language constructs 114 in the source program. As explained above tags are simple or complex, and so we may refer to simple (or complex) function-based tags and simple (or complex) class-based tags.

In some embodiments, the "association" between a tag and a function declaration or a class declaration may be established by the tag name being the same as the function name (in the case of a function-based tag) or the class name (in the case of a class-based tag). The compiler 122 may use the names of tags, functions, and classes to match tags with functions or classes. In some embodiments, the tag name and the function or class name may be related in a way other than by an identity relation. For example, the tag name may have a special character(s) that is combined with the function name (or class name) as a prefix or a suffix. For instance, if the function name is
   book-title
then the tag name may be
   _book-title
In general, any naming convention may be defined that can be distinguished by the compiler 122.

In some embodiments, the processing of a tag that is associated with a function declaration or a class declaration may be accomplished in a runtime environment. For example, the programming language constructs 114 and markup language constructs 116 comprising the source program 102 merely define associations between function declarations and class declarations that appear in the programming language constructs and tags that are referenced in the markup language constructs. The source program 102 may be compiled to produce intermediate code 104. A suitable naming convention for name function and class declarations and tags allows the compiler 122 to identify and make the associations between tags and function declarations or tags and class declarations in the intermediate code 104, and to inform the execution engine 124 of the associations. A tag may be "processed" when the execution engine 124 executes the intermediate code 104 at runtime. This aspect of the present disclosure will be discussed in more detail below.

Function-Based Tags

Figure 2:
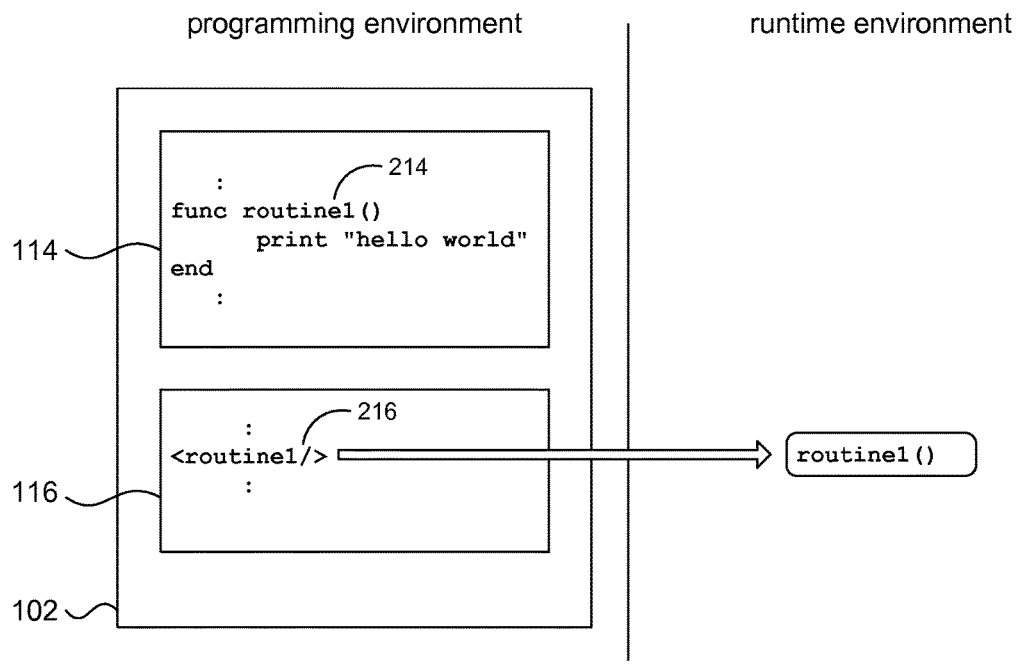
FIGS. 2 and 3 illustrate examples of simple function-based tags.

A series of examples will further illustrate the integration of programming language constructs and markup language constructs in accordance with principles of the present disclosure. Consider the example shown in FIG. 2, illustrating the integration of a function declaration and a simple tag. The programming language constructs 114 in the source program 102 include a function declaration 214 which defines a function routine1. The body of the function routine1 comprises a "print" instruction. The markup language constructs 116 in the source program 102 includes a tag 216 having a tag name routine1. When the compiler 122 compiles and links source program 102, the compiler can detect that the tag 216 is associated with one of the function declarations, namely routine1 (for example, by virtue of tag 216 having the same name as the function declaration 214). The compiler 122 may then generate intermediate code 104 which includes an invocation of the function routine1 by tag 216. Thus, when the execution engine 124 processes tag 216 at runtime, the execution engine may invoke the function routine1. The output "hello world" produced by the function called may become the output of the tag. The tag 216 is an example of a simple function-based tag.

Figure 3:
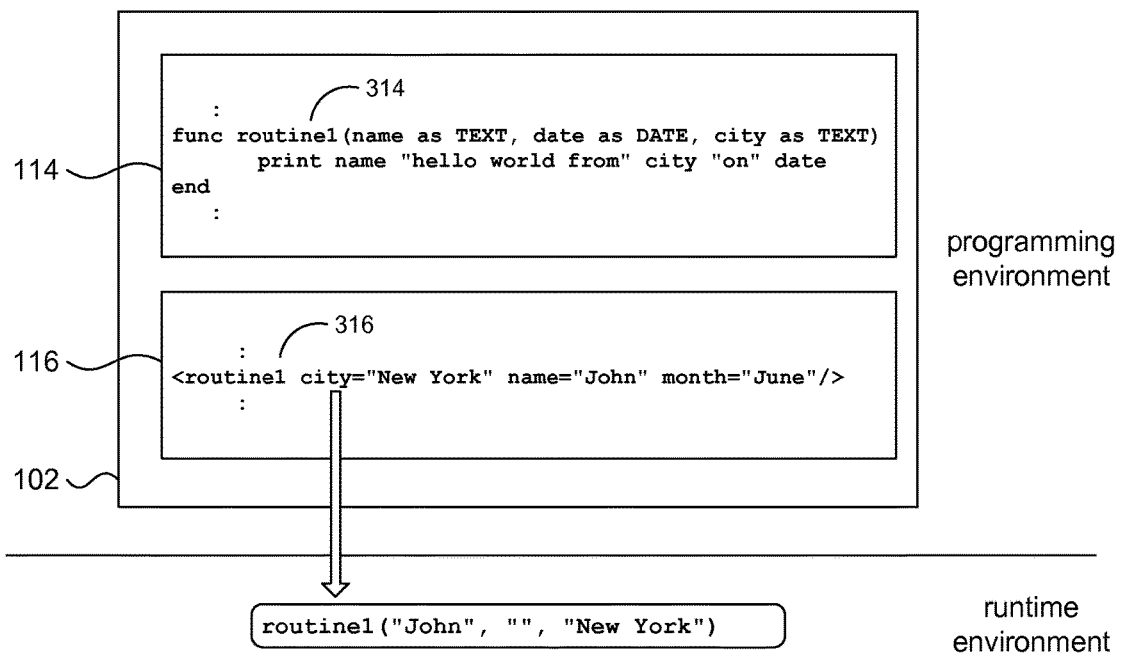

FIG. 3 shows an example illustrating the integration of function parameters and tag attributes. In this example, a function declaration 314 that is declared among the programming language constructs 114 in the source program 102 includes the following parameters: name, date, and city. A simple tag 326 is referenced among the markup language constructs 116 in the source program 102 and specifies the following attributes: name and city. When the compiler 122 compiles and links source program 102, the compiler can detect that tag 316 is associated with the function declaration routine1. Moreover, the compiler 122 can detect that tag 316 includes attributes that are associated with (correspond to, match) parameters of the function routine1, namely city and name; e.g., by virtue of a naming convention that uses the same name in the function declaration as in the tag reference.

The compiler 122 may then generate intermediate code 104 which includes an invocation of the function routine1 that is associated with tag 316. The function invocation may further include passing any attribute values of the attributes of tag 316 that are associated with the parameters in the function declaration 314. Thus, for example, the compiler 122 may produce intermediate code 104 that includes code to cause the execution engine 124 to perform the following invocation:

routine1 ("John", " ", "New York")

when the execution engine processes tag 316 at runtime.

Some points are worth noting in the example shown in FIG. 3. A tag that matches a function may specify zero or more attributes that match the parameters of the function. For example, the attributes of tag 316 match only two of the parameters of the function routine1, namely name and city. In some embodiments, the compiler 122 may assign a null value to a missing parameter. For example, the date parameter in the function routine1 has no matching attribute in the tag reference, and so the parameter that is passed may be an empty string. The specific form of the null value may depend on the data type of the parameter; e.g., an empty string for TEXT, an integer 0 for INT, a float 0.0 for FLOAT, and so on.

The ordering of the parameters in a function and the ordering of matching attributes in the matching tag reference may be different. For example, in FIG. 3, the parameters of function routine1 appear in the order name, date, and city. However, the matching attributes in tag 316 are city followed by name, and there is no date attribute. In some embodiments, the compiler 122 may rely on the same naming convention that is used between functions and tags to make a similar match up between function parameters and tag attributes, so that the order in which the parameters appear in the function declaration do not need to line up with the order in which the attributes are specified in the tag.

Although not illustrated in FIG. 3, in some embodiments, the compiler 122 may perform type casting of attribute values when attribute values are passed in a function invocation. In some embodiments, attribute values of tag attributes are expressed as quoted strings. However, function parameters may be any data type (e.g., TEXT, INT, CHAR, FLOAT, etc.) that is defined by the grammar of the programming language constructs 114. Accordingly, compiler 122 may detect the data type of a function parameter and perform type casting of the attribute value of the matching attribute. In some embodiments, the type casting may be performed at compile time so that the attribute value is expressed in the proper data format in the intermediate code 104. In other embodiments, the type casting may be performed in the runtime environment.

Figure 4:
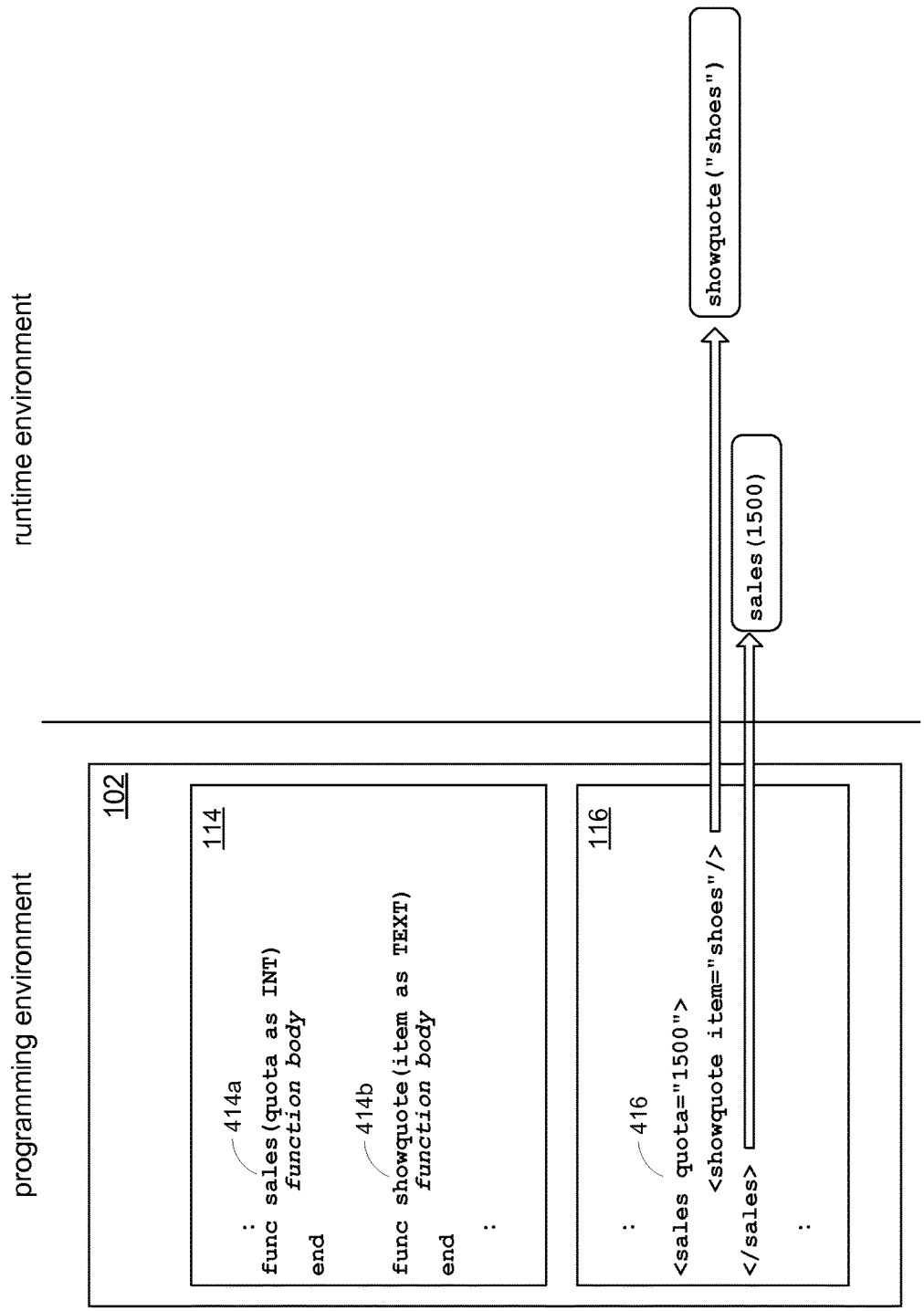
FIG. 4 illustrates and example of a simple class-based tag.

FIG. 4 illustrates an example of a complex function-based tag. In this example, programming language constructs 114 in the source program 102 include a function declaration 414a named sales and a function declaration 414b named showquote. The markup language constructs 116 in the source program 102 include a complex tag 416 called sales. When the compiler 122 compiles source program 102, the compiler will detect that complex tag 416 matches a function declaration among the programming language constructs 112, namely sales. Compiler 122 may generate intermediate code 104 to provide processing of the complex function-based tag 416 at runtime.

The complex tag 416 has a non-empty body, comprising a child tag showquote. Tag 416 may therefore be referred to as a "parent tag". In some embodiments, the compiler 122 may generate intermediate code 104 to process the child tag. If the child tag is itself a complex function-based tag, then the intermediate code 104 may include code to invoke the very process that is currently being described, to process the child tag. Those of ordinary skill in the computer programming arts will recognize this as "recursive processing" or recursion.

In some embodiments, the children tags in a complex tag may be processed before processing the parent tag. More generally, in accordance with the present disclosure, the body of a complex tag is processed before processing the parent tag. If the body includes a complex child tag, then the body of that complex child tag is processed before processing the child tag. This is sometimes referred to as a "depth first" recursive processing order.

Continuing with FIG. 4, as explained, the child tag of parent tag 416 may be processed before processing of the parent tag. For example, the child tag showquote will be processed, and in particular the child tag showquote will be processed as a simple function-based tag which includes invoking its matching function, namely showquote. When the child tag has been processed, the parent tag 416 may be processed (in particular, the opening tag <sales quote="1500">), including invoking the function sales, and passing the attribute value "1500" as an integer parameter to the function call. The compiler 122, for example, may trigger on the closing tag </sales> to generate code in the intermediate code 104 to process the opening tag component of the complex tag.

Class-Based Tags

Figure 5:
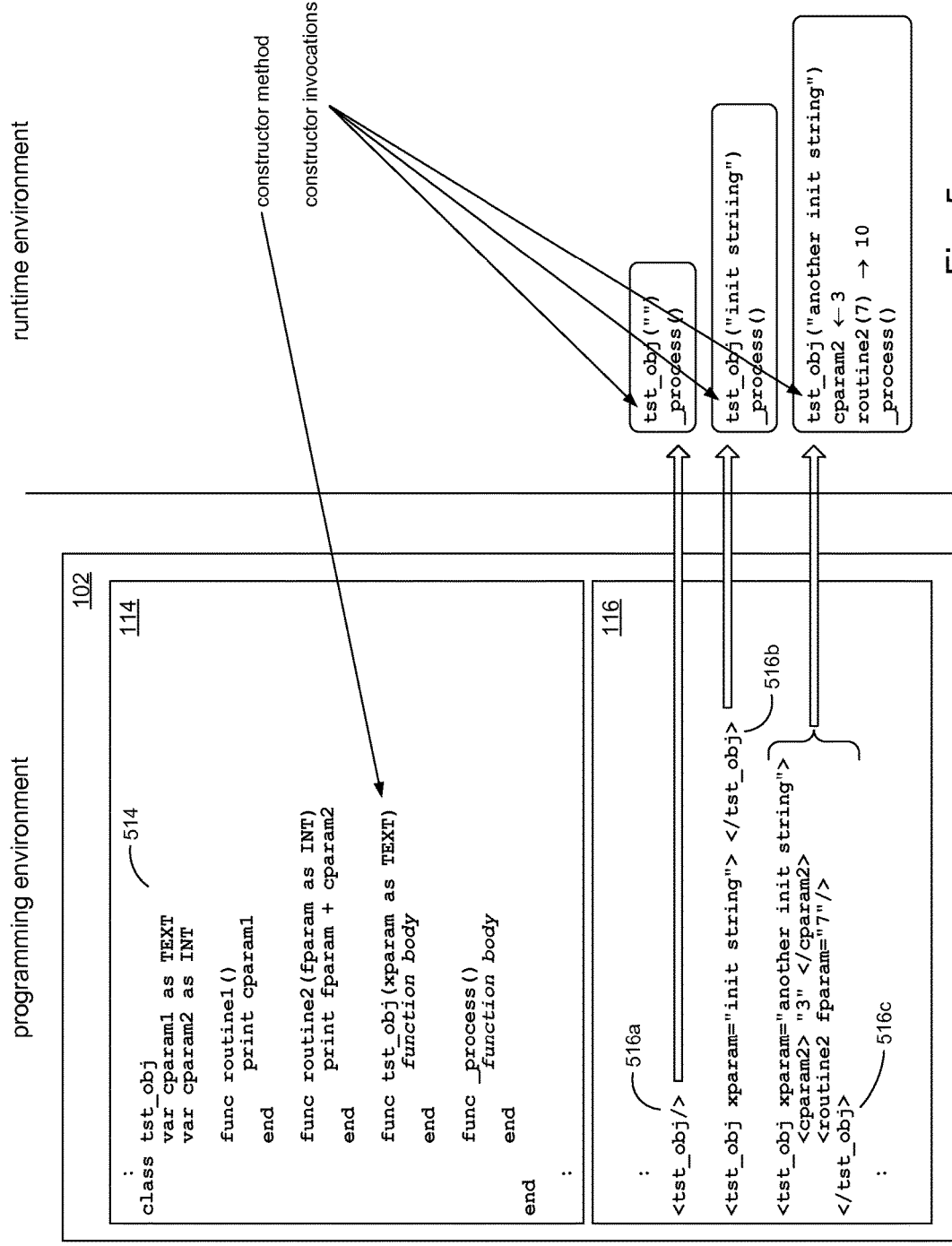
FIG. 5 illustrates examples of complex function-based and class-based tags.

FIG. 5 shows an example of a class-based tag, illustrating the integration of a class declaration with a tag reference. The programming language constructs 114 in the source program 102 may include a class declaration 514 that defines a class called tst_obj. The body of the class tst_obj defines class variables cparam1 and cparam2, and two methods routine1 and routine2. The function declaration for routine2 includes a parameter fparam. The markup language constructs 116 in the source program 102 include references to a simple tag 516a and two complex tags 516b and 516c.

In accordance with principles of the present disclosure, the processing of a class-based tag may include: invoking a "constructor" method (constructor), which includes instantiating the object; initializing class variables of the class tag with output from any matching children tags; processing remaining children tags, processing non-tag elements; and invoking a "processor" method. Additional details of how children tags are processed will be discussed below. As understood by those of ordinary skill, the constructor is one of the special methods mentioned above that may be invoked at the time of object instantiation, typically to initialize the data state of the instantiated object. The constructor may be defined in the class declaration and identified by having the same name as the class. In accordance with the present disclosure, the "process method" is another of the special methods mentioned above that may be executed as the last step when processing a class-based tag. The processor method may be defined in the class declaration and identified by a predefined keyword such as "_process", for example. Consider now some examples of processing class-based tags.

Consider first, the processing of tag 516a; this is an example of a simple class-based tag. When the compiler 122 compiles and links source program 102, the compiler can detect that tag 516a is associated with one of the class declarations, namely tst_obj; for example, by virtue of tag 516a having the same name as the class declaration 514. The compiler 122 may then generate intermediate code 104 which includes code to instantiate, at runtime, an object defined by the tst_obj class declaration. The intermediate code 104 may include an invocation to a constructor, including passing any matching tag attributes as parameters to the constructor. In the example shown in FIG. 5, tag 516a has no tag attribute and so no parameters are passed to the constructor. The constructor tst_obj may be invoked by the execution engine 124 during processing of tag 516a at runtime. If a constructor in not defined in a class declaration, the intermediate code 104 may simply not include a constructor invocation. Since tag 516a is a simple tag, there is no tag body and so the intermediate code 104 for processing tag 516a may simply conclude with code to invoke the process method in the class declaration (if it is defined). The delimiter "/>" in the tag 516a may trigger the compiler 122 to generate code to invoke the process method.

Consider next the processing of tag 516b. This is an example of a complex tag, albeit a trivial example since the tag 516b has no tag body. The intermediate code 104 produced for the tag 516b may include instantiation of the object and invocation of the constructor tst_obj. Tag 516b includes a tag attribute that matches the parameter xparam of the constructor tst_obj. Accordingly, the compiler 122 may generate code in intermediate code 104 that passes the attribute value "init string" of the matching attribute to the constructor tst_obj. Since tag 516b has no tag body, the intermediate code 104 simply includes code that invokes the process method.

Consider next the processing of tag 516c. The processing of tag 516c by the execution engine 124 at runtime may include invoking the constructor with the attribute value "another init string" as the input parameter to the constructor. Tag 516c is a complex tag having a non-empty tag body, comprising children tags cparam2 and routine2. Accordingly, tag 516c may be referred to as the parent tag. In some embodiments, the compiler 122 may generate intermediate code 104 to process each child tag. For example, if a child tag is a class-based tag, then intermediate code 104 may include code to invoke the very process that is currently being described to process the class-based child tag; i.e. recursive processing and, if the child tag has children, the recursive processing may be performed in a depth first processing order.

If the child tag matches a class variable defined in the class declaration, then the intermediate code 104 generated by the compiler 122 may include code to process the child tag, and any resulting generated tag body (i.e., output) may be assigned to the matching class variable. As explained above, processing of the child tag may involve recursive processing if the child tag itself comprises children tags. With respect to the example of tag 516c shown in FIG. 5, the child tag cparam2 matches one of the class variables, namely cparam2. Accordingly, the intermediate code 104 may provide for processing of the child tag cparam2, during runtime execution, which in this particular example will produce the output "3". The intermediate code 104 may include code to assign the value 3 as an integer to the class variable cparam2.

If the child tag matches a method defined in the class declaration, then the intermediate code 104 may include invoking the matched method at runtime. For example, the intermediate code 104, at runtime, may process the child tag routine2 in tag 516c by invoking the matching method routine2 defined in the class declaration 514.

If the child tag matches a function declaration, then the intermediate code 104 generated by the compiler 122 may provide for processing the child tag at runtime as a function-based tag in the manner described above. It will be appreciated that processing of the child tag may involve recursive processing if the child tag itself comprises children tags.

When the children tags have been processed, the intermediate code 104 may include code to invoke the process method of the complex class-based tag 516c. For example, the compiler 122 may use the closing tag </tst_obj> as a trigger to generate code in the intermediate code 104 to invoke the process method.

Content Referencing

Figure 6:
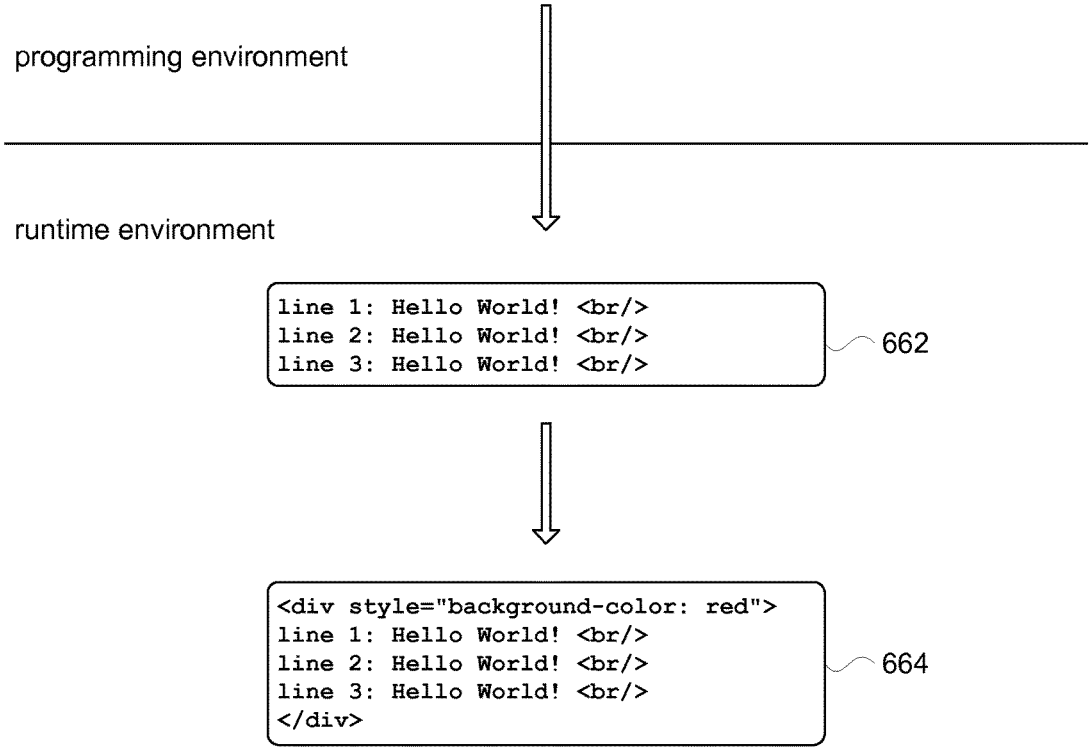
FIG. 6 illustrates an example of a function accessing tag contents from within the function.

In accordance with principles of the present disclosure, a function may access contents of tag output of the tag from which the function was invoked. FIG. 6 illustrates an example of accessing tag output in accordance with principles of the present disclosure. The tag 616 is a complex function-based tag. When the compiler 122 compiles and links source program 102, the compiler can detect that the tag 616 and the function declaration 614 have the same name, namely showContent, and may generate intermediate code 104 to provide for invoking the function showContent at runtime when the tag 616 is processed. As described above, the body of a complex function-based tag is processed before processing the opening tag part (e.g., <showContent color="red">) of the parent tag. In the case of tag 616, the body comprises non-tag elements, namely a FOR loop programming language construct. When the FOR loop is executed at runtime, output 662 is generated as the output of the body of tag 616.

The closing tag part of tag 616, namely </showContent>, triggers processing of the opening tag <showContent color="red">, which includes invocation of the function showContent with the attribute color being passed to the function call as a parameter. The function declaration 614 includes a keyword _content_. The keyword _content_ may direct the compiler 122 to generate intermediate code 104 that incorporates the output of the body of the tag from which the function was invoked. In the example in FIG. 6, the output of the body of complex tag 616 is output 662. Accordingly, when the function showContent executes at runtime, the intermediate code 104 may include code to place the output 662 in the location where the keyword _content_ appears, to produce output 664 from the function invocation, which would be the output of tag 616.

Illustrative Implementation and Runtime Data Structures

Figure 7:
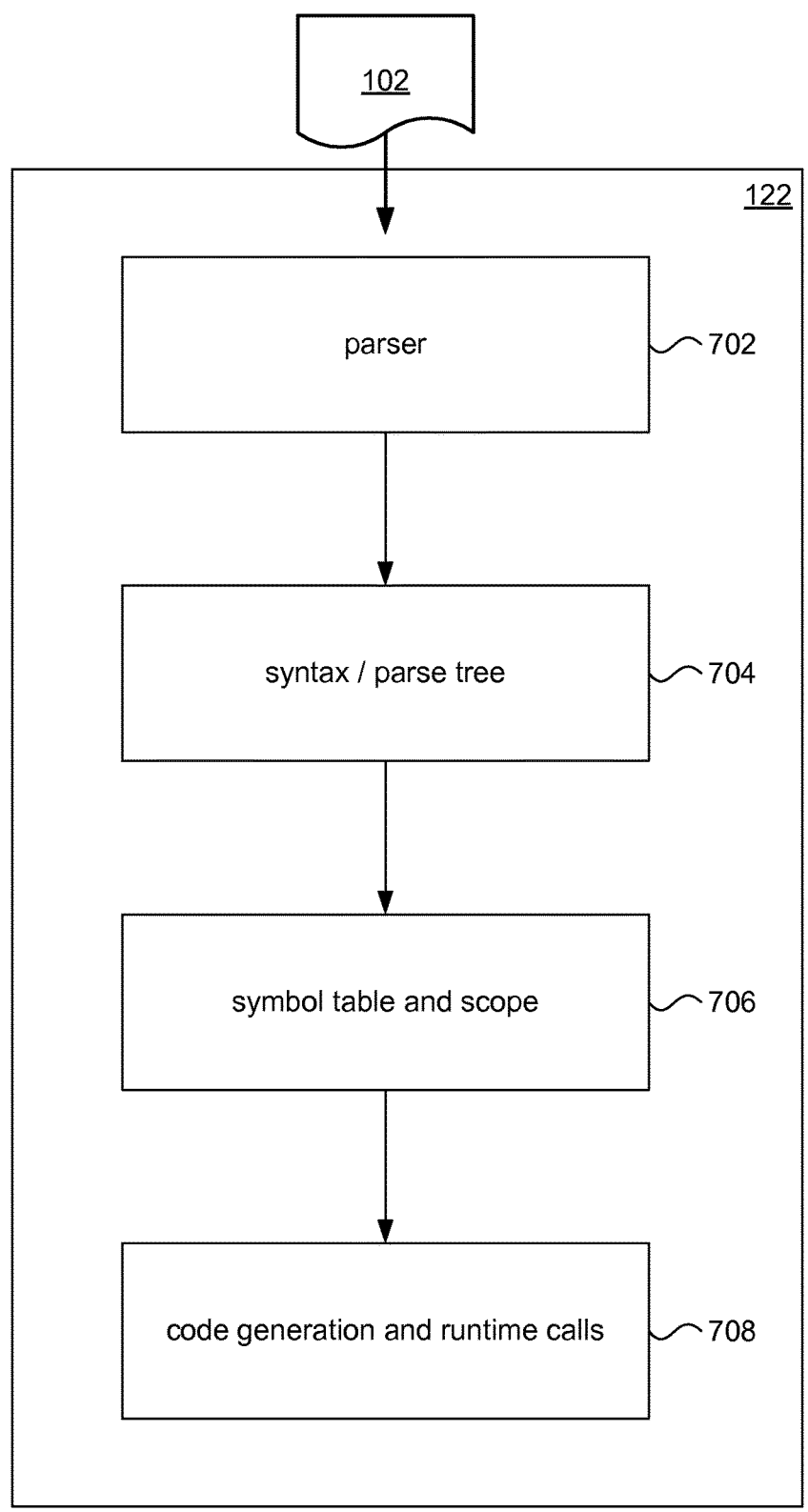
FIG. 7 shows a high level block diagram of a compiler in accordance with the present disclosure.

An illustrative implementation example in accordance with the present disclosure will now be described. Referring to FIG. 7, the implementation may involve several areas of the programming language system to process the programming language constructs 114 and the markup language constructs 116 that comprise the program source 102. The compiler 122, for example, may include a parser 702 that can process markup language productions, in addition to traditional procedural language productions. A syntax/parse tree 704 generated by the parser includes node types for the tag elements identified among the markup language constructs 116, in addition to node types traditional program elements identified among the programming language constructs 114. A symbol table 706 may store the tag nodes and information relating to their scope, in addition to the programming language nodes. A code generation module 708 may generate proper runtime calls based on the tag nodes and the programming language node. Each of these elements of the programming language system will now be discussed.

Parser

Figure 8:
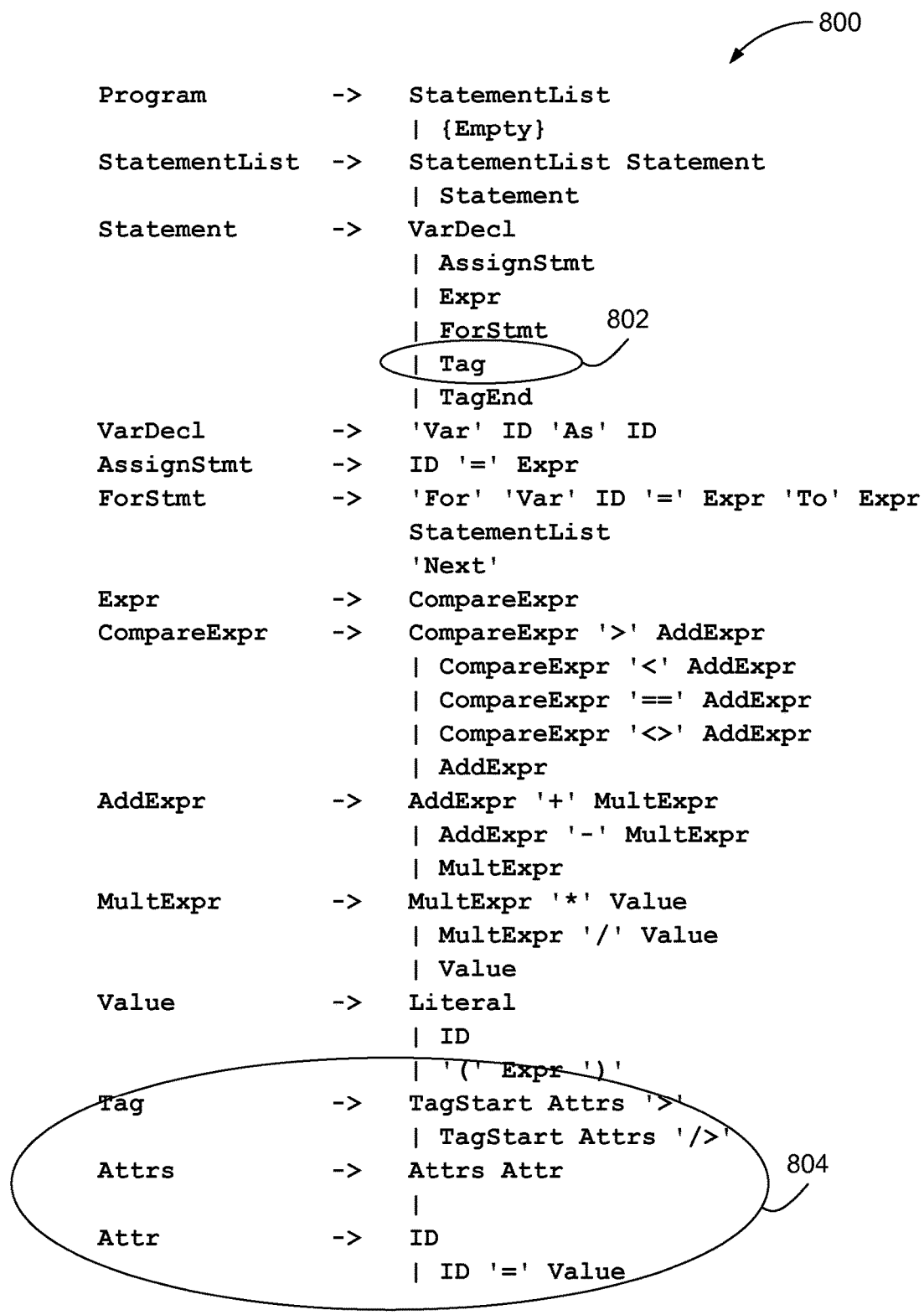
FIG. 8 illustrates a simple grammar according to the present disclosure.

The parser 702 may be configured to recognize both a procedural programming language syntax and a markup language syntax. FIG. 8 shows an example of a partial listing of a grammar 800 in accordance with the present disclosure. In addition to the syntax typically found in a programming language, the grammar 800 includes syntax 802, 804 for a markup language. For example, syntax 802, 804 define tokens that define a Tag.

Syntax Parse Tree

The parse tree 704 may contain both program language nodes and markup language nodes. Consider the following program example:

```
class tabs extends wcomponent
    public var tag as subtab[ ]
end
class subtab extends wcomponent
    var title as string
    var value as string
end
<tab s>
    for var i=1 to 3
        <tab title="t1">
            Hello World!
        </tab>
    next
</tabs>
```

Figure 9:
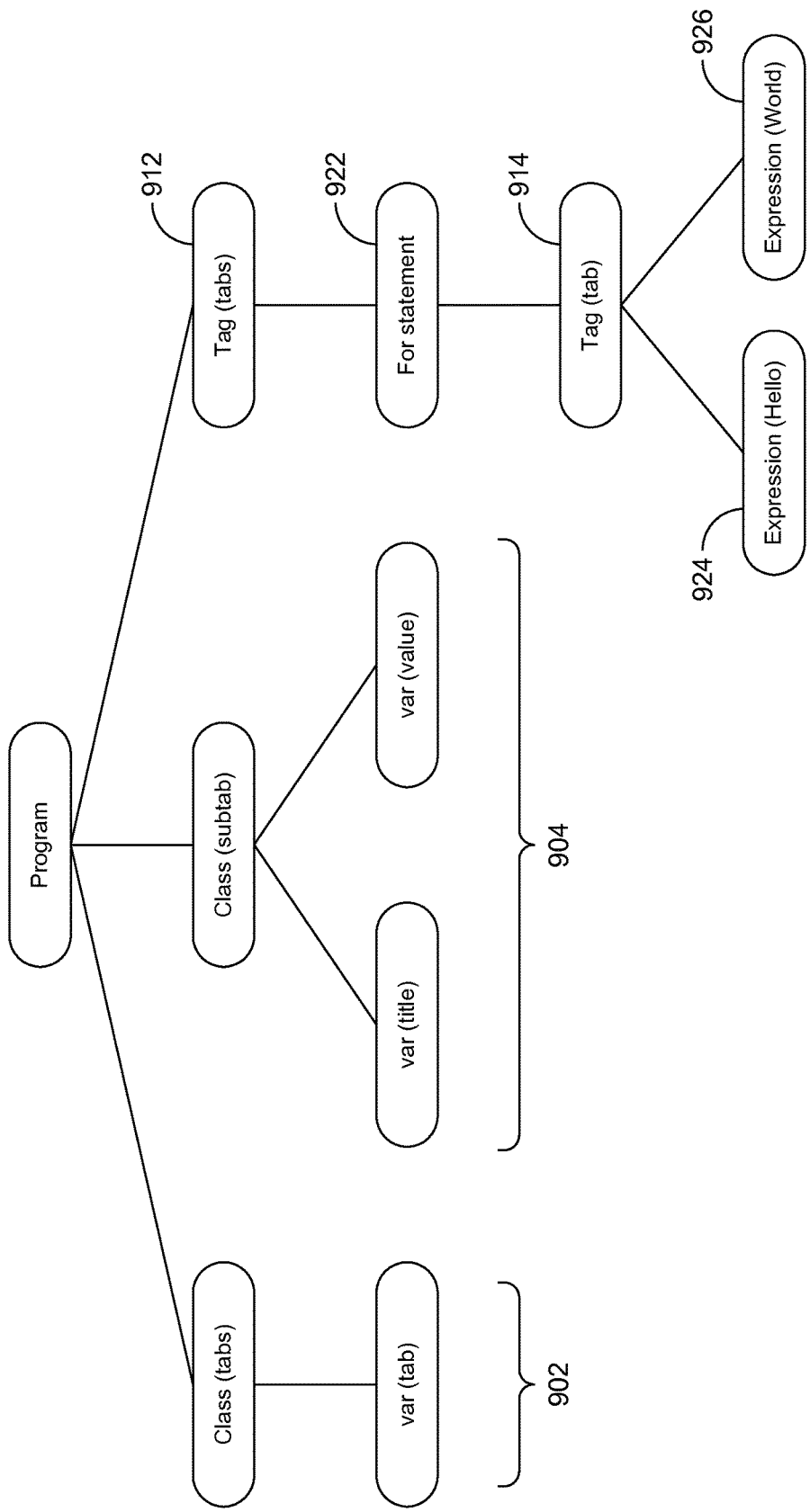
FIG. 9 shows a parse tree that can be generated from the grammar in FIG. 8.

The above program may produce the syntax tree 900 shown in FIG. 9, for example in accordance with the grammar 800 show in FIG. 8. The syntax tree 900 includes a branch 902 comprising nodes for the class declaration tabs and a branch for the class declaration subtab, which are standard programming language constructs. In accordance with the present disclosure, the syntax tree 900 also includes tag nodes 912 and 914, created when the tag references tabs and tab, shown in the above example, were parsed. Note that the syntax tree 900 integrates programming language nodes 922, 924, and 926 with the tag nodes 912, 914.

Symbol Table and Scope, 706

Figure 10:
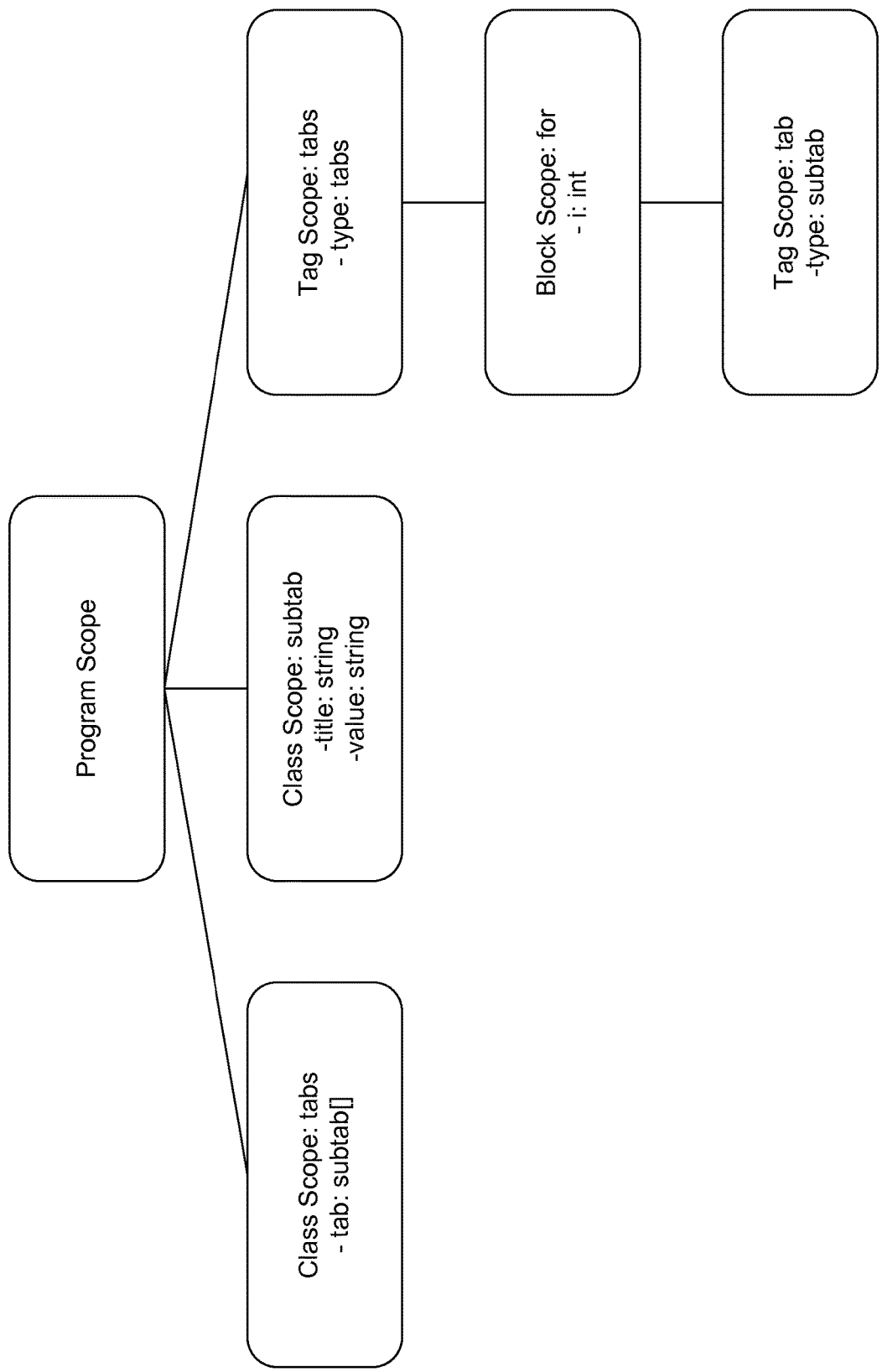
FIG. 10 shows an example of a scope tree.

The scope hierarchy includes a new type of scope "tag scope" to accommodate the tag references among the markup language constructs 116. In accordance with the present disclosure, tag scope contains references to the declaring type of the tag. During semantic analysis, the compiler 122 performs a lookup for type information for all the tag references made in the markup language constructs 116. In above program example, for instance, the parser will associate the class declaration tabs with the tag reference <tabs>. Similarly, the parser will associate the class declaration subtabs with the tag reference <subtabs>. FIG. 10 illustrates an example of a scope tree augmented with tag scope.

Code Generation and Runtime Data Structures

In accordance with the present disclosure, the code generator module 708 may generate the intermediate code 104, which may comprise a list of runtime calls. The intermediate code 104 may be expressed in any suitable executable form such as machine code, Java code, and so on. For example, FIG. 11 shows a Java code representation of intermediate code 104 for the program example shown above.

Figure 12:
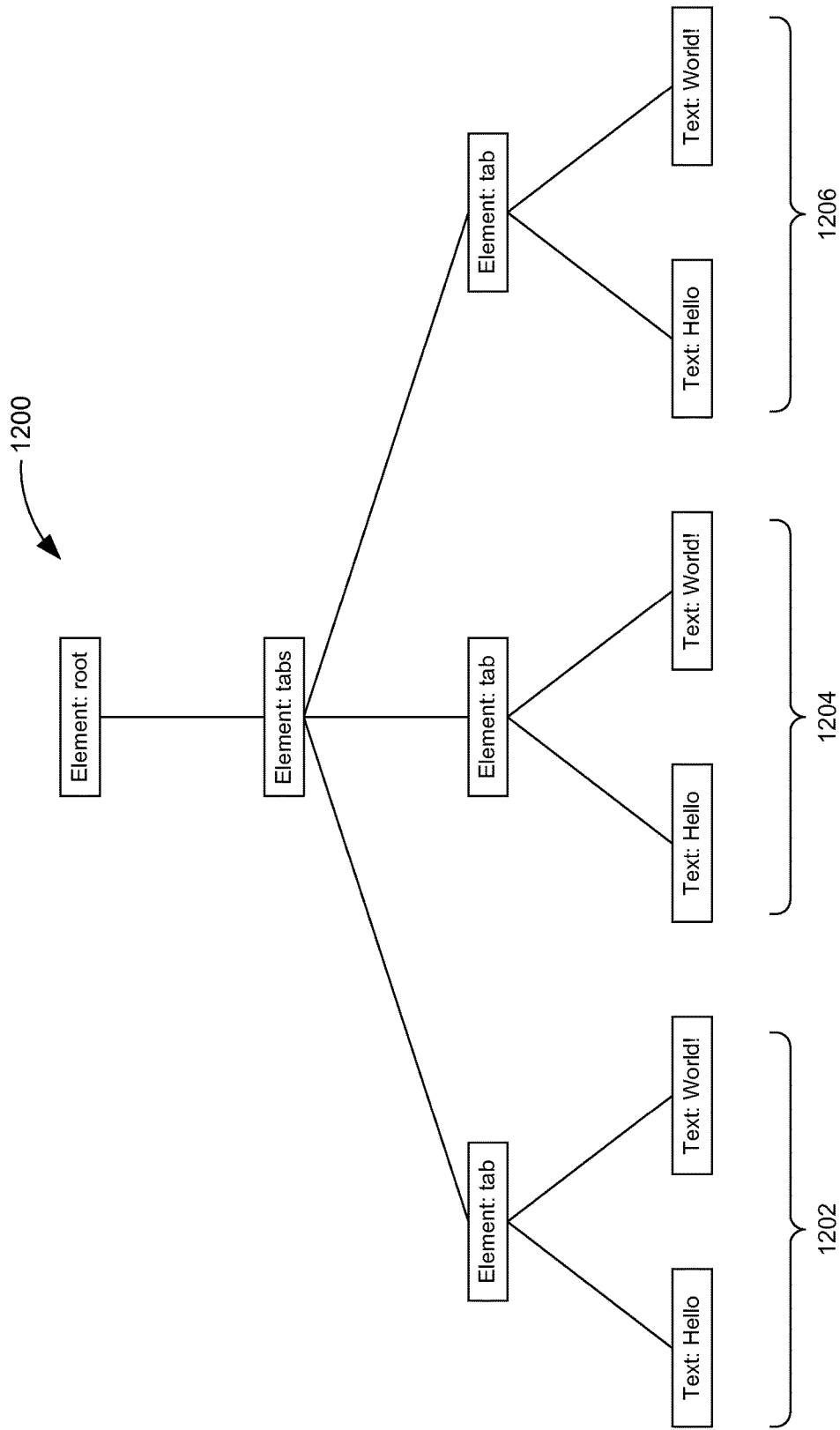
FIG. 12 shows an example of an element tree.

FIG. 12 shows an example of a data structure, referred to an element tree, that may be used to process tags at runtime. The element tree 1200 shown in the figure represents the program example shown above. For example, each iteration in the FOR loop has a runtime representation 1202, 1204, 1206 in the element tree 1200. In some embodiments, each element (e.g., Element: root, Element: tabs, and so on) in the element tree may include:

element attributes: stores name/value pair for element attributes; for example, as shown in FIG. 11, the attribute "title"/"t1" is a name value pair that is for the tag "tab"

element body processing result: When the runtime environment processes an element body, it does not immediately generate child elements for the current element. Instead, the processing will be stored in a separate variable.

child elements: Child elements are generated by the element processor.

object instance: For class based tags, we associate a corresponding object instance with the element node.

Figure 13A:
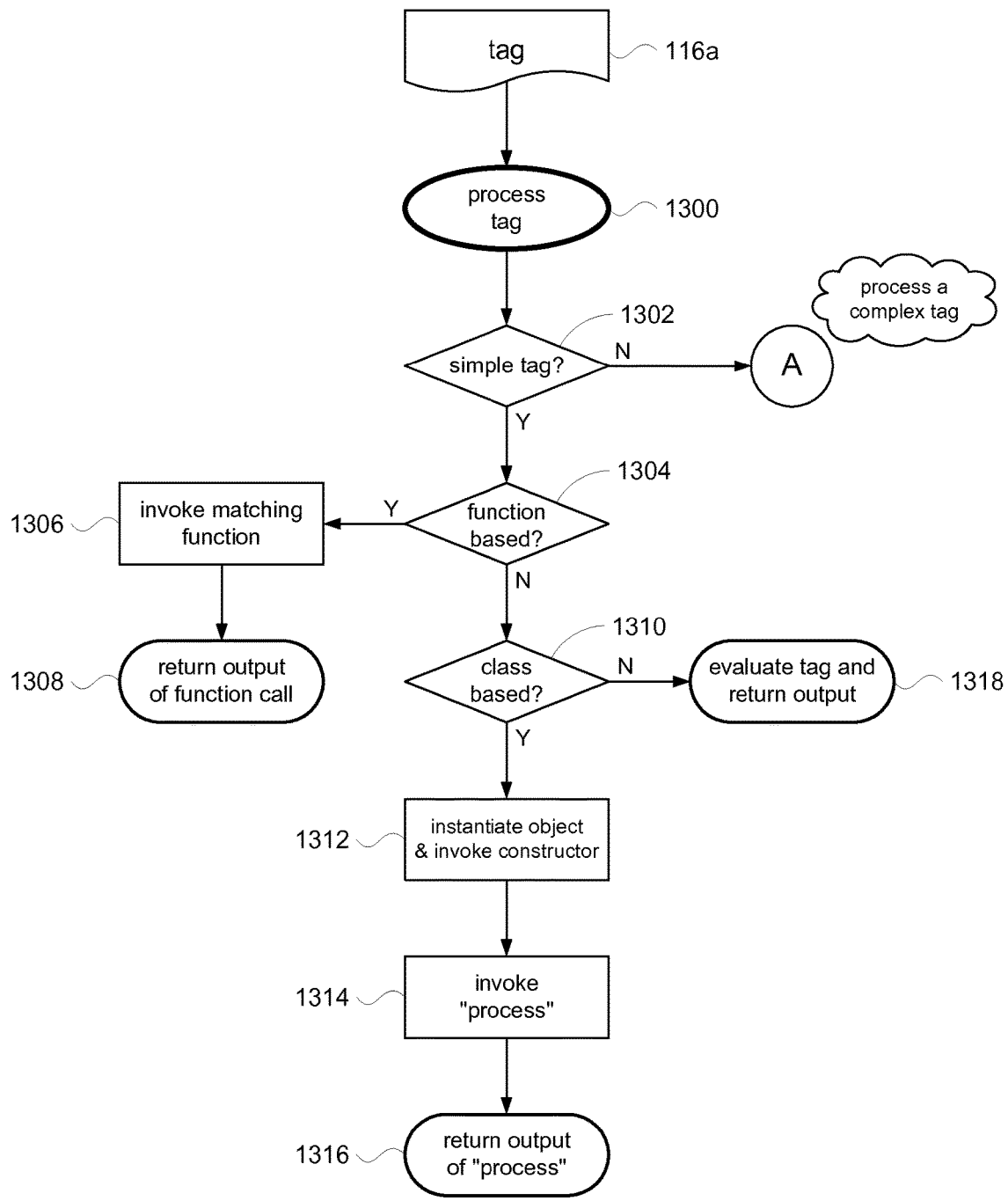
FIGS. 13A-13B illustrate the logical flow of tag processing in accordance with the present disclosure.
Figure 13B:
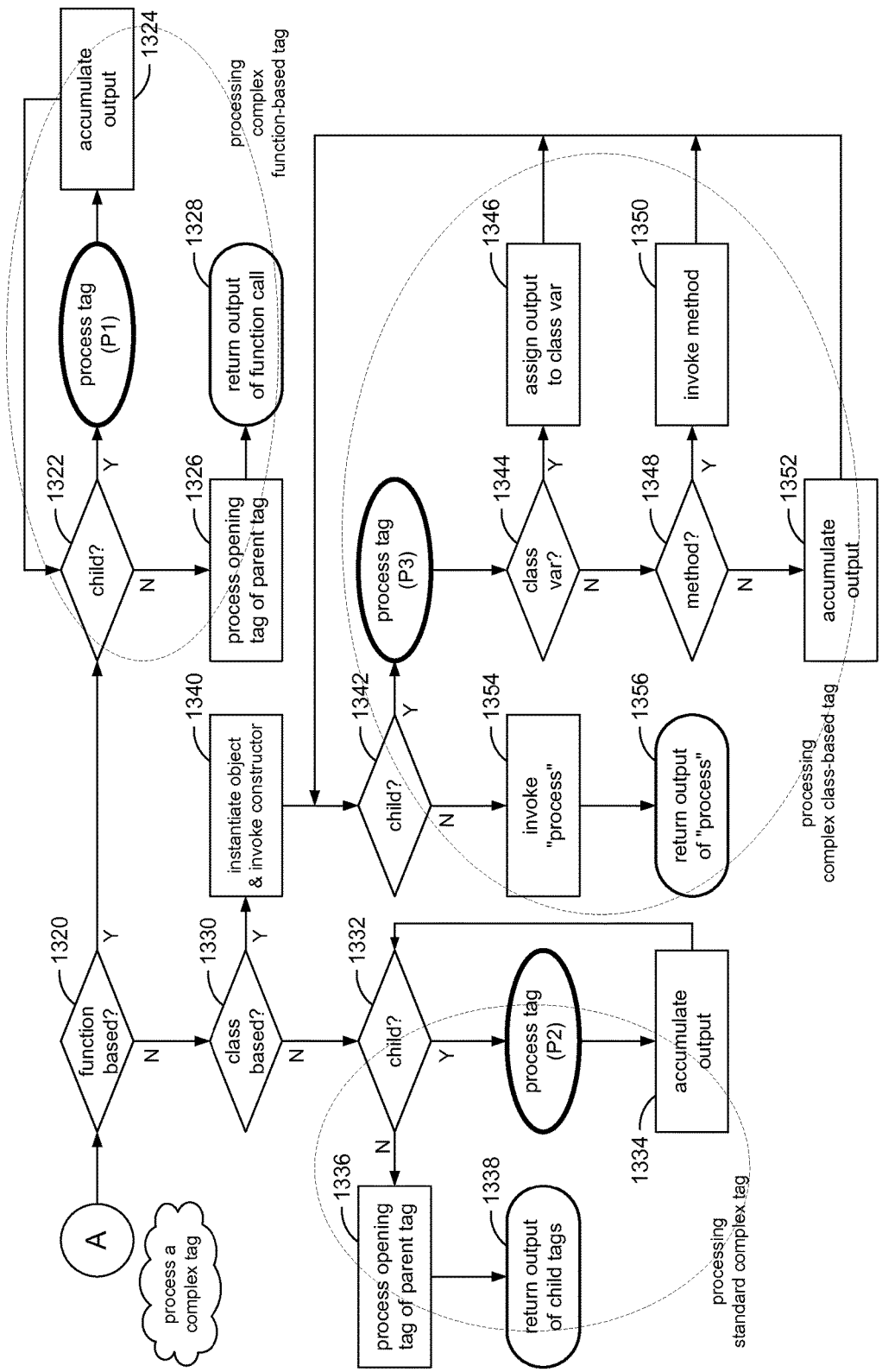

Referring to FIGS. 13A and 13B, when the execution engine 124 executes the intermediate code 104, tags referenced among the markup language constructs 116 will be processed in accordance with the examples set forth above. FIGS. 13A and 13 B provide a logical workflow of the processing of tags in accordance with the present disclosure. It will be appreciated, of course, that the workflow depicted in FIGS. 13A and 13B is not actually implemented in the intermediate code 104, but rather is simply a logical representation of how a tag may be processed. Thus, when the execution engine 124 receives a tag reference 116*a*, processing of the tag may proceed as follows. Tag processing of tag 116*a* begins at 1300, where a determination is made at 1302 whether the tag is a simple tag or a complex tag. If tag 116*a* is a complex tag, then processing proceeds to the workflow, via connector A, shown in FIG. 13B. If tag 116*a* is determined (1304) to be a simple function-based tag (e.g., 216, FIG. 2 or 316, FIG. 3), then the tag is processed (1306) as explained above. For example, the matching function is invoked. If the tag 116*a* includes attributes (e.g., 316), then any matching tag attributes are passed to the function invocation. Any output of the function invocation (call) is returned (1308). How the output returned in 1308 may be used will become clear in the context of processing children tags described below.

Continuing from 1304, if tag 116*a* is determined (1310) to be a class-based simple tag (e.g., 516*a*, FIG. 5), then the tag is processed as explained above. For example, at 1312 an object of the class is instantiated and the constructor (if defined in the class declaration) is invoked. If the tag 116*a* includes attributes, then any matching attributes are passed to the constructor. When execution returns from the constructor invocation, the process method (if defined) is invoked at 1314. The process method may access any output from the constructor invocation. Any output of the process invocation is returned (1316).

Continuing from 1310, if tag 116*a* is class-based, then the tag is a standard simple tag. In 1318, the tag 116*a* may be evaluated, and any output produced by the evaluation is returned.

Continuing from 1302, if tag 116*a* is a complex tag, the processing continues with the workflow shown in FIG. 13B via connector A. A determination is made in 1320 whether tag 116*a* is a complex function-based tag (e.g., 416, FIG. 4); i.e., if the name of the tag matches a function declaration. If so, then if a determination is made in 1322 that tag 116*a* includes a child tag (e.g., showquote in tag 416), then tag processing P1 is performed on the child tag, where the child tag is processed beginning from 1300 in FIG. 13A. This is an example of recursive processing. When tag processing P1 on the child tag has completed, any output that is returned from tag processing of the child tag may accumulated at 1324. For example, the output of one child tag may be concatenated with the output of a previously processed child tag. All children tag of the "parent" tag 116a are processed in the 1322, P1, 1324 loop. After all the children tags have been processed (or if there were no children to begin with), the opening tag (e.g., <sales quota="1500"> of tag 416) of the parent tag 116a may be processed at 1326, including passing any matching tag attributes as parameters to an invocation of the function that matches the tag name in the opening tag. Any output of the function invocation is returned (1328).

Continuing from 1320, a determination is made in 1330 whether the tag 116a is a complex class-based tag. If not, then the tag 116a is a standard complex tag and processing moves to 1332. If a determination is made in 1332 that the tag 116a includes a child tag, then tag processing P2 is performed on the child tag by recursively processing the child tag beginning from 1300. When tag processing P2 on the child tag has completed, any output that is returned from tag processing of the child tag may accumulated at 1334. All children tag of the "parent" tag 116a are processed in the 1332, P2, 1334 loop. After all the children tags have been processed (or if there were no children to begin with), the opening tag of the parent tag 116a (which in this processing branch is a standard complex tag) is processed 1336. Any output is returned (1338).

Continuing from 1330, if the tag 116a is determined to be a complex class-based tag (e.g., 516b and 516c, FIG. 5), then an object is instantiated and the constructor (if defined) is invoked at 1340, including passing any matching tag attributes in the opening tag (e.g., <tst_obj xparam="init string">) as parameters to the invocation. If a determination is made in 1342 that the tag 116a includes a child tag (e.g., cparam and routine2 in 516c), then tag processing P3 is performed on the child tag by recursively processing the child tag beginning from 1300. When tag processing P3 on the child tag has completed, if it is determined at 1344 that the child tag matches a class variable (e.g., cparam), then any output from processing the child tag at P3 is assigned to the class variable at 1346. If, instead, it is determined at 1348 that the child tag matches a method (e.g., routine2), then the method is invoked along with any matching tag attributes. If the child tag does not match a class variable or a method (i.e., the child tag is a standard tag), then the output of processing the tag at P3 is accumulated at 1352 (e.g., by concatenating with the output of a previously processed standard tag). All children tags of the "parent" tag 116a are processed in the 1342, P3, 1344-1352 loop. After all the children tags have been processed (or if there were no children to begin with), the process method (if defined) is invoked at 1354. Any output of the process method invocation is returned (1356).

The output from the children tags is fed to the function body or process method as input. It is up to the function body or process method to decide what to do with the output of the child tag. For tags that do not have a matching function or class, a dummy method is called, which simply copies the output of child tag to the output of the parent tag.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising operating a computer system to perform steps of:
    receiving a document having:
        markup language constructs comprising a plurality of tags in a first section of the document comprising a first plurality of lines of code; and
        a plurality of function declarations in a second section of the document separate from the first section of the document and comprising a second plurality of lines of code, the plurality of function declarations comprising the second plurality of lines of code, which define a plurality of corresponding functions, wherein one or more of the function declarations correspond to tags in the first section and have function names the same as tag names of the corresponding tags; and
    performing a step of tag processing on a first tag among the plurality of tags in the markup language constructs, including:
        executing a body of the first tag and producing tag output; and
        subsequent to executing the body of the first tag, invoking a first function, declared among the plurality of function declarations, having a function name that is the same as a tag name of the first tag, and during invocation of the first function accessing the tag output produced as a result of executing the body of the first tag.

2. The method of claim 1 wherein the first tag includes at least one attribute, wherein invoking the first function includes passing a value of the attribute as a parameter of the first function.

3. The method of claim 1 wherein executing the body of the first tag includes tag processing child tags in the body before invoking the first function referenced by the first tag.

4. The method of claim 3 wherein one or more of the child tags produce output, wherein the step of executing the first tag further includes using at least a portion of the output produced by the child tags.

5. The method of claim 1 wherein the step of tag processing is a recursive step.

6. The method of claim 1 wherein the programming language is a procedural language or an object oriented language.

7. The method of claim 1 wherein the first function includes one or more tags.

8. The method of claim 1 wherein the body of the first tag includes one or more programming language constructs.

9. The method of claim 1 wherein executing the body of the first tag includes recursively tag processing tags comprising the body of the first tag.

10. A method comprising operating a computer system to perform steps of:
    receiving a document having:
        markup language constructs comprising a plurality of tags in a first section of the document comprising a first plurality of lines of code; and
        object oriented language constructs in a second section of the document separate from the first section of the document and comprising one or more class declarations, each class declaration comprising a second plurality of lines of code wherein one or more of the class declarations correspond to tags in the first section and have class names the same as tag names of the corresponding tags; and performing a step of class processing on a first tag among the plurality of tags in the markup language constructs, including:
   executing the body of the first tag and producing tag output; and
   subsequent to executing the first tag, invoking a predefined method that is referenced in a class declaration having a class name the same as the first tag, and during invocation of the predefined method accessing the tag output produced as a result of executing the body of the first tag.

11. The method of claim 10 if a child tag of the first tag corresponds to a method defined in the class declaration that corresponds to the first tag, then invoking the method.

12. The method of claim 11 wherein the method accesses the output from the child tag that corresponds to the class variable.

13. The method of claim 10 wherein the class processing further comprises invoking a second predefined method associated with the class declaration referenced by the first tag.

14. The method of claim 13 wherein the first tag includes at least one attribute, wherein invoking the second predefined method includes passing a value of the attribute as a parameter of the second predefined method.

15. The method of claim 10 further comprising performing class processing on all child tags of the first tag which have a corresponding class declaration declared among the object oriented language constructs before processing child tags of the first tag that are not based on a class declaration.

16. The method of claim 10 wherein, while executing the body of the first tag, if a child tag of the first tag corresponds to a class variable defined in a class that corresponds to the first tag, then producing output from the child tag and associating the output with the class variable.

17. A non-transitory computer readable storage medium comprising computer executable program code, which when executed by a computer system caused the computer system to perform steps comprising:
   receiving a document having:
      markup language constructs comprising a plurality of tags in a first section of the document comprising a first plurality of lines of code; and
      a plurality of function declarations in a second section of the document separate from the first section of the document and comprising a second plurality of lines of code, the plurality of function declarations comprising the second plurality of lines of code, which define a plurality of corresponding functions, wherein one or more of the function declarations correspond to tags in the first section and have function names the same as tag names of the corresponding tags; and
   performing a step of tag processing on a first tag among the markup language constructs, including:
      executing the body of the first tag and producing tag output; and
      subsequent to executing the body of the first tag, invoking a first function, declared among the plurality of function declarations, having a function name that is the same as a tag name of the first tag, and during invocation of the first function accessing the tag output produced as a result of executing the body of the first tag.

18. The non-transitory computer readable storage medium of claim 17 wherein executing the body of the first tag includes recursively tag processing tags comprising the body of the first tag.

19. A non-transitory computer readable storage medium comprising computer executable program code, which when executed by a computer system caused the computer system to perform steps comprising:
   receiving a document having:
      markup language constructs comprising a plurality of tags in a first section of the document comprising a first plurality of lines of code; and
      object oriented language constructs in a second section of the document separate from the first section of the document and comprising one or more class declarations, each class declaration comprising a second plurality of lines of code wherein one or more of the class declarations correspond to tags in the first section and have class names the same as tag names of the corresponding tags; and
   performing a step of class processing on a first tag among the plurality of tags in the markup language constructs, including:
      executing the body of the first tag and producing tag output; and
      subsequent to executing the first tag, invoking a predefined method referenced in a class declaration having a class name the same as the first tag, and during invocation of the predefined method accessing the tag output produced as a result of executing the body of the first tag.

20. The non-transitory computer readable storage medium of claim 19 wherein, while executing the body of the first tag, if a child tag of the first tag corresponds to a class variable defined in a class that corresponds to the first tag, then producing output from the child tag and associating the output with the class variable.

* * * * *